(12) United States Patent
Maienschein

(10) Patent No.: US 10,316,947 B2
(45) Date of Patent: Jun. 11, 2019

(54) TORQUE TRANSMISSION DEVICE

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 69 days.

(21) Appl. No.: 15/325,005

(22) PCT Filed: Jun. 25, 2015

(86) PCT No.: PCT/DE2015/200392
§ 371 (c)(1),
(2) Date: Jan. 9, 2017

(87) PCT Pub. No.: WO2016/004945
PCT Pub. Date: Jan. 14, 2016

(65) Prior Publication Data
US 2017/0204954 A1  Jul. 20, 2017

(30) Foreign Application Priority Data
Jul. 11, 2014  (DE) .......................... 10 2014 213 538

(51) Int. Cl.
| *F16D 13/26* | (2006.01) |
| *F16H 45/02* | (2006.01) |
| *F16D 13/76* | (2006.01) |
| *F16D 13/40* | (2006.01) |

(52) U.S. Cl.
CPC ............. *F16H 45/02* (2013.01); *F16D 13/76* (2013.01); *F16D 13/26* (2013.01); *F16D 13/40* (2013.01); *F16H 2045/0205* (2013.01); *F16H 2045/0226* (2013.01); *F16H 2045/0263* (2013.01)

(58) Field of Classification Search
CPC ............. F16H 45/02; F16H 2045/0263; F16H 2045/0221; F16H 2045/0205; F16D 13/26; F16D 13/40
See application file for complete search history.

(56) References Cited

U.S. PATENT DOCUMENTS

| 3,252,352 | A | * | 5/1966 | General ................. F16H 45/02 192/3.22 |
| 5,103,947 | A | | 4/1992 | Okuzumi |
| 5,310,033 | A | | 5/1994 | Shibayama |
| 6,494,303 | B1 | | 12/2002 | Reik et al. |
| 9,097,330 | B2 | | 8/2015 | Ideshio et al. |

(Continued)

FOREIGN PATENT DOCUMENTS

| CN | 103228957 | 7/2013 |
| DE | 10024191 | 11/2000 |

(Continued)

*Primary Examiner* — David J Hlavka
(74) *Attorney, Agent, or Firm* — Davidson, Davidson & Kappel, LLC

(57) ABSTRACT

A torque converter (10) including a lock-up clutch, the lock-up clutch (20) having an axially displaceable and/or axially elastic actuating element (26) for actuating the lock-up clutch, the actuating element being designed as a component different from the turbine and being mounted on the turbine.

20 Claims, 2 Drawing Sheets

(56) References Cited

U.S. PATENT DOCUMENTS

| | | | | |
|---|---|---|---|---|
| 2006/0086584 | A1* | 4/2006 | Maucher | F16D 47/06 |
| | | | | 192/3.29 |
| 2013/0230385 | A1* | 9/2013 | Lindemann | F16D 33/18 |
| | | | | 415/122.1 |
| 2014/0097055 | A1* | 4/2014 | Lindemann | F16H 41/24 |
| | | | | 192/3.21 |
| 2015/0021137 | A1* | 1/2015 | Lindemann | F16H 45/02 |
| | | | | 192/3.29 |
| 2015/0152951 | A1* | 6/2015 | Rentfrow | F16H 45/02 |
| | | | | 192/3.29 |
| 2015/0198227 | A1* | 7/2015 | Blough | F16H 45/02 |
| | | | | 192/3.26 |
| 2015/0308553 | A1* | 10/2015 | Avins | F16H 41/28 |
| | | | | 192/3.29 |
| 2016/0116042 | A1* | 4/2016 | Depraete | F16H 45/02 |
| | | | | 192/3.29 |
| 2016/0377158 | A1* | 12/2016 | Dinger | F16F 15/145 |
| | | | | 192/3.28 |
| 2017/0268653 | A1* | 9/2017 | Depraete | F16H 45/02 |
| 2017/0307056 | A1* | 10/2017 | Verhoog | F16H 45/02 |
| 2017/0315662 | A1* | 11/2017 | Reynolds | G06F 3/0416 |

FOREIGN PATENT DOCUMENTS

| | | |
|---|---|---|
| DE | 102011010342 | 8/2011 |
| DE | 102013202661 | 9/2013 |
| JP | H09119505 | 5/1997 |
| JP | 2882093 | 4/1999 |
| JP | 2013036587 | 2/2013 |

* cited by examiner

TORQUE TRANSMISSION DEVICE

BACKGROUND

A torque transmission device situated in a power train of a motor vehicle is known from DE102013202661, which is operatively situated between a drive side and an output side and includes a torque converter, which has a housing, in which a pump, a turbine and a lockup clutch are situated for the purpose of transmitting a torque between the drive side and the output side, the lockup clutch including an axially displaceable actuating element, designed as a turbine, for actuating the lockup clutch.

SUMMARY OF THE INVENTION

It is an object of the present invention to improve the reliability of a torque transmission device, to reduce the manufacturing costs, to reduce the installation space requirements and/or to improve the power, in particular of the lockup clutch.

Accordingly, a torque transmission device is proposed, operative between a drive side and an output side and including a torque converter, which has a housing in which a pump, a turbine and a lockup clutch are situated for the purpose of transmitting a torque between the drive side and the output side, the lockup clutch including an axially displaceable and/or axially elastic actuating element for actuating the lockup clutch, the actuating element being designed as a component which is different from the turbine and is mounted on the turbine. In particular, the power of the torque transmission device may be improved thereby.

One particularly preferred embodiment of the present invention is characterized in that the actuating element is fastened directly to the turbine.

One particularly special specific embodiment of the present invention is characterized in that the turbine is axially displaceable.

Another special embodiment of the present invention is characterized in that the actuating element acts in the direction of the housing for the purpose of actuating the lockup clutch.

One advantageous specific embodiment of the present invention is characterized in that the actuating element acts in the direction of the output side for the purpose of actuating the lockup clutch.

One preferred special specific embodiment of the present invention is characterized in that the torque transmission device includes a torsional vibration damper and/or a damper device, in particular a centrifugal pendulum absorber.

Another special embodiment of the present invention is characterized in that the actuating element furthermore forms a component of the torsional vibration damper and/or the absorber device, in particular a damper input part, a pendulum flange and/or a rotation angle limiting element.

One preferred special specific embodiment of the present invention is characterized in that the turbine includes a turbine wheel shell and turbine blades, and the actuating element is mounted on the turbine wheel shell.

One particularly preferred embodiment of the present invention is characterized in that the actuating element presses against the housing in an at least temporarily non-parallel manner during the actuation of the lockup clutch. The use of the installation space with regard to the clutch and/or the hydrodynamic performance may be increased thereby. The friction lining and/or the actuating element may be provided with a conical design compared to the mating surface on the housing, with which the friction lining is able to interact.

One particularly special specific embodiment of the present invention is characterized in that the actuating element accommodates at least one friction lining.

The torque converter may also be generally connected to a torsional vibration damping device and/or absorber device situated outside the housing.

Further advantages and advantageous embodiments of the present invention result from the description and the drawings.

BRIEF DESCRIPTION OF THE DRAWINGS

The present invention is explained in detail below with reference to the figures. Specifically.

DETAILED DESCRIPTION

Figure 1:
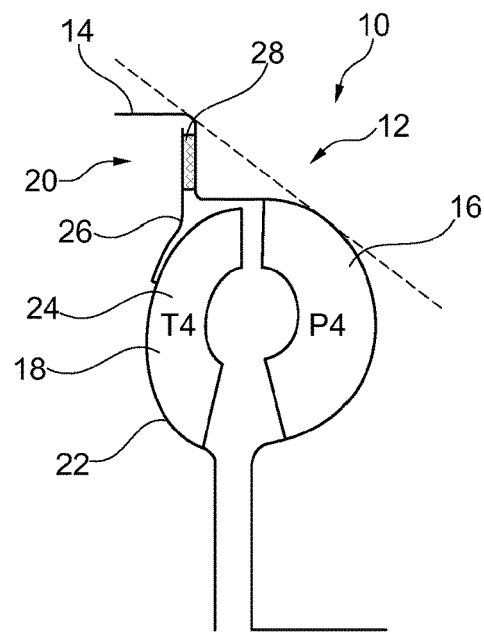
FIG. 1 shows a half section of a cross section of a torque transmission device in one special specific embodiment of the present invention.

FIG. 1 shows a half section of a cross section of a torque transmission device 10 in one special specific embodiment of the present invention. It includes a torque converter 12, which is operatively introduced between a drive side and an output side and which has a housing 14, in which a pump 16, a turbine 18 and a lockup clutch 20 are situated between the drive side and the output side for the purpose of transmitting a torque. Turbine 18 includes a turbine wheel shell 22 and turbine blades 24, which are rotatably fixedly suspended thereon.

Lockup clutch 20 includes an axially displaceable actuating element 26 for actuating lockup clutch 20, which is designed as a component which is different from turbine 18 and is rotatably fixedly, in particular fixedly, mounted directly on turbine 18, in particular on turbine wheel shell 22. Specifically, actuating element 26 is riveted or welded to turbine 18.

Actuating element 26 has a radial extension, on which the actuating element accommodates a friction lining 28 on the axial side facing in the direction of housing 14. To actuate lockup clutch 20, actuating element 26, which is axially displaceable together with turbine 18, is displaced in the direction of housing 14, whereby friction lining 28 may be brought into frictional engagement with housing 14.

Figure 2:
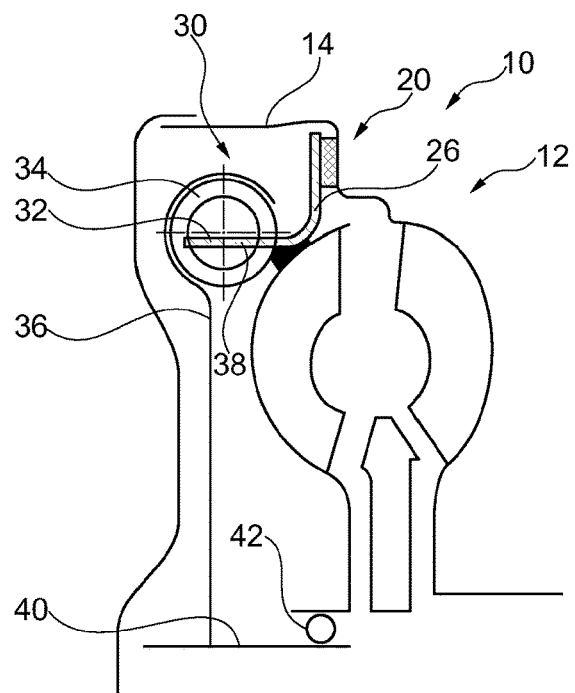
FIG. 2 shows a half section of a cross section of a torque transmission device in another special specific embodiment of the present invention.

FIG. 2 shows a half section of a cross section of a torque transmission device 10 in another special specific embodiment of the present invention. As part of the torque transmission device, torque converter 12 includes not only lockup clutch 20 with actuating element 26 but also a torsional vibration damper 30 in its housing 14. Torsional vibration damper 30 includes an input part 32 and an output part 36, which is rotatable to a limited extend with respect thereto via the action of energy storage elements 34. Input part 32 is partially formed by actuating element 26, which has an axial projection 38 for this purpose, with the aid of which energy storage elements 34 may be acted upon.

Output part 36 is rotatably fixedly connected to an output hub 40. Output hub 40, in turn, is connectable to a transmission input shaft.

Turbine 18 is supported on output hub 40 via a bearing element 42 and is axially displaceable with respect thereto for the purpose of facilitating an actuation of lockup clutch 20, together with actuating element 26.

Figure 3:
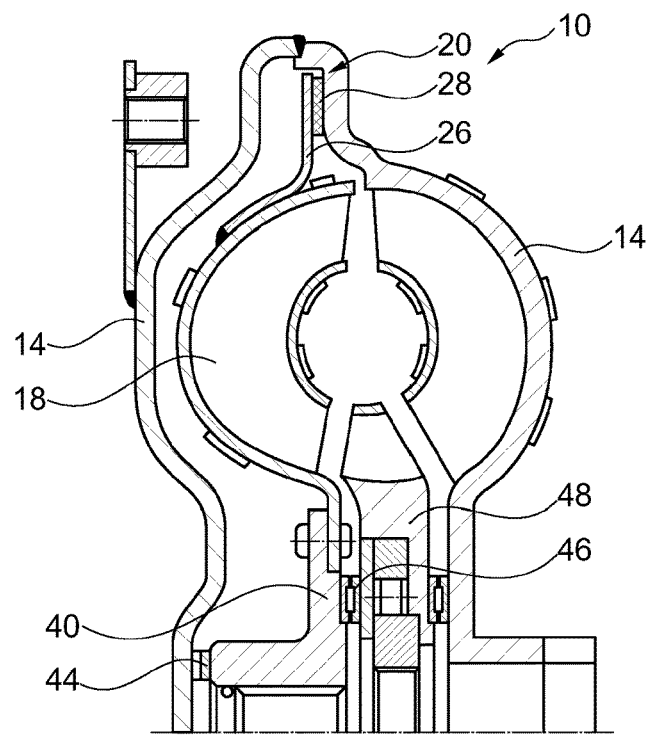
FIG. 3 shows a half section of a cross section of a torque transmission device in another special specific embodiment of the present invention.

FIG. 3 shows a half section of a cross section of a torque transmission device 10 in another special specific embodiment of the present invention. Turbine 18 in this case is not axially displaceable; instead, actuating element 26 of lockup clutch 20 as such is axially elastic and/or is axially elastically mounted on turbine 18. Actuating element 26 accommodates a friction lining 28, which may be brought into frictional engagement with housing 14.

The turbine includes an output hub 40 radially internally, which, may be supported on housing 14 via an axial bearing element 44, on the one hand, and on guide wheel 48 via another axial bearing element 46, on the other hand.

Figure 4:
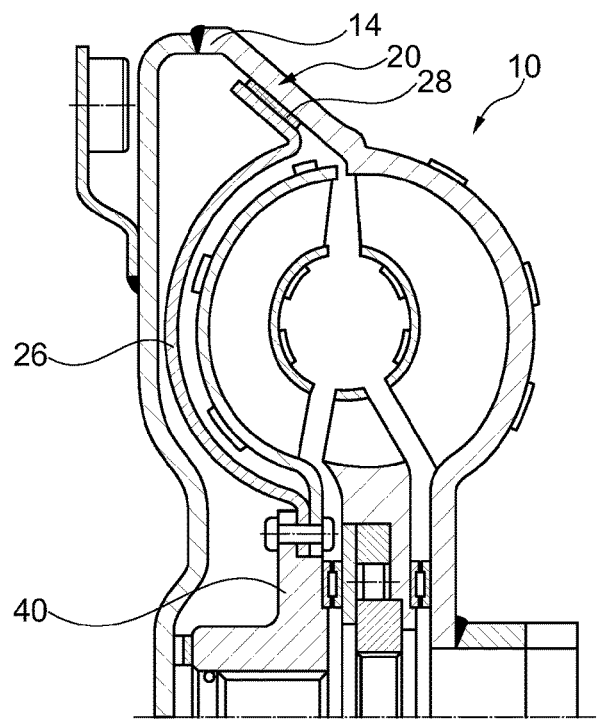
FIG. 4 shows a half section of a cross section of a torque transmission device in another special specific embodiment of the present invention.

FIG. 4 shows a half section of a cross section of a torque transmission device 10 in another special specific embodiment of the present invention. Actuating element 26, together with output hub 40, is mounted, in this case specially riveted, on turbine 18 in a radially inner area. Actuating element 26 is axially elastic, so that an actuation of lockup clutch 20 may take place. The area of actuating element 26 where friction lining 28 is accommodated is designed to be inclined with respect to the radial direction, and the area of housing 14 is correspondingly also able to interact with friction lining 28.

What is claimed is:

1. A torque transmission device, operative between a drive side and an output side and comprising:
   a torque converter having a housing, a pump, a turbine and a lockup clutch being situated in the housing for transmitting a torque between the drive side and the output side, the lockup clutch including an axially displaceable or elastic actuating element for actuating the lockup clutch, the actuating element being designed as a component different from the turbine and mounted on the turbine.

2. The torque transmission device as recited in claim 1 wherein the actuating element is fastened directly to the turbine.

3. The torque transmission device as recited in claim 1 wherein the turbine is axially displaceable.

4. The torque transmission device as recited in claim 1 wherein the actuating element acts in a direction of the housing for a purpose of actuating the lockup clutch.

5. The torque transmission device as recited in claim 1 wherein the actuating element acts in a direction of the output side for a purpose of actuating the lockup clutch.

6. The torque transmission device as recited in claim 1 further comprising a torsional vibration damper or a damper device.

7. The torque transmission device as recited in claim 6 further comprising the damper device, the damper device being a centrifugal pendulum absorber.

8. The torque transmission device as recited in claim 6 wherein the actuating element furthermore forms a component of the torsional vibration damper or the damper device.

9. The torque transmission device as recited in claim 8 wherein the component of the torsional vibration damper or the damper device is a damper input part, a pendulum flange or a rotation angle limiting element.

10. The torque transmission device as recited in claim 1 wherein the turbine includes a turbine wheel shell and turbine blades, and the actuating element is mounted on the turbine wheel shell.

11. The torque transmission device as recited in claim 1 wherein the actuating element presses against the housing in an at least temporarily non-parallel manner during the actuation of the lockup clutch.

12. The torque transmission device as recited in claim 1 wherein the actuating element accommodates at least one friction lining.

13. The torque transmission device as recited in claim 1 wherein the turbine includes a turbine wheel shell and turbine blades, the actuating element has a radial extension extending radially outward past the turbine wheel shell.

14. The torque transmission device as recited in claim 13 wherein an axial side of the radial extension facing the housing accommodates a friction lining, the radial extension being axially displaceable with the turbine shell for bringing the friction lining into frictional engagement with the housing.

15. The torque transmission device as recited in claim 9 wherein the torsional vibration damper includes a damper output part, the damper input part including axial projections for contacting an energy storage element that allow the damper input part to be rotatable to a limited extent with respect to the damper output part.

16. The torque transmission device as recited in claim 15 wherein the damper output part is rotatably fixedly connected to an output hub that is connectable to a transmission input shaft.

17. The torque transmission device as recited in claim 16 wherein the turbine is supported on the output hub via a bearing element and is axially displaceable with respect to the output hub for facilitating an actuation of lockup clutch, together with the actuating element.

18. The torque transmission device as recited in claim 1 wherein the turbine is not axially displaceable and the actuating element is axially elastic or is axially elastically mounted on the turbine.

19. The torque transmission device as recited in claim 18 wherein the actuating element accommodates at least one friction lining.

20. The torque transmission device as recited in claim 1 wherein the actuating element is fixed to the turbine at a radially inner area of the turbine radially inside turbine blades of the turbine.

\* \* \* \* \*